US007627106B1

(12) United States Patent  (10) Patent No.: US 7,627,106 B1
Croak et al.  (45) Date of Patent: Dec. 1, 2009

(54) METHOD AND APPARATUS FOR SENDING UPDATES TO A CALL CONTROL ELEMENT FROM AN APPLICATION SERVER

(75) Inventors: Marian Croak, Fair Haven, NJ (US); Hossein Eslambolchi, Los Altos Hills, CA (US)

(73) Assignee: AT&T Corporation, New York, NY (US)

( * ) Notice: Subject to any disclaimer, the term of this patent is extended or adjusted under 35 U.S.C. 154(b) by 798 days.

(21) Appl. No.: 11/234,912

(22) Filed: Sep. 26, 2005

(51) Int. Cl.
*H04M 7/00* (2006.01)
*H04L 12/66* (2006.01)
(52) U.S. Cl. .................................. 379/220.01; 370/352
(58) Field of Classification Search ............ 379/201.01; 370/352
See application file for complete search history.

(56) References Cited

U.S. PATENT DOCUMENTS 7,304,984 B2 * 12/2007 Butler et al. ................. 370/352
7,447,194 B1 * 11/2008 Schlesener et al. .......... 370/352

* cited by examiner

*Primary Examiner*—William J. Deane

(57) ABSTRACT

A method and apparatus for enabling Application Servers to automatically update the databases used by Call Control Elements as changes occur between customer data, such as customer specific logic, and the Application Servers, such as the IP addresses of the Application Servers are disclosed. Whenever there is a change in the location of customer specific data needed by the CCEs, e.g., switching from one AS to a new AS, the new AS will automatically update the relevant database in the CCEs to indicate such an update has occurred. After the automatic update is performed, the CCEs will be able to communicate with the correct AS to retrieve and process the customer specific service logic.

20 Claims, 4 Drawing Sheets

METHOD AND APPARATUS FOR SENDING UPDATES TO A CALL CONTROL ELEMENT FROM AN APPLICATION SERVER

The present invention relates generally to communication networks and, more particularly, to a method and apparatus for sending automatic updates to a Call Control Element (CCE) from an Application Server (AS) in communication networks, e.g., packet networks such as Voice over Internet Protocol (VoIP) networks.

BACKGROUND OF THE INVENTION

Customer data is frequently mapped to a particular application server in a packet network structure, e.g., a VoIP network infrastructure. This mapping changes frequently as the service requirements of the customer changes and/or as physical changes are made in the application server environment within the VoIP network. Call Control Elements (CCE) need to access these Application Servers (AS) in order to retrieve and process customer specific service logic to complete phone calls. Hence, CCEs need to know which application server contains the customer specific information needed to complete a call originated from or destined to a particular subscriber. In a large VoIP network, there may be many CCEs. As the IP addresses of particular ASs change, the CCEs need to determine the correct IP address of a particular AS to communicate with in order to obtain and process the correct customer specific routing and service logic information. If the CCEs do not have the correct information associated with the particular AS that the CCEs need to communicate with, a call can fail. A CCE is a network element that performs call control functions to setup a call. An AS is a network element that comprises the data as well as applications that the CCE needs in order to setup a call.

Therefore, a need exists for a method and apparatus for sending automatic updates to a Call Control Element (CCE) from an Application Server (AS) in a packet network, e.g., a VoIP network.

SUMMARY OF THE INVENTION

In one embodiment, the present invention enables Application Servers to automatically update the databases used by Call Control Elements as changes occur between customer data, such as customer specific service logic, and the Application Servers, such as the IP addresses of the Application Servers. Whenever there is a change in the location of customer specific data needed by the CCEs, e.g., switching from one AS to a new AS, the new AS will automatically update the relevant database in the CCEs to indicate such an update has occurred. After the automatic update is performed, the CCEs will be able to communicate with the correct AS to retrieve and process the customer specific routing and service logic.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
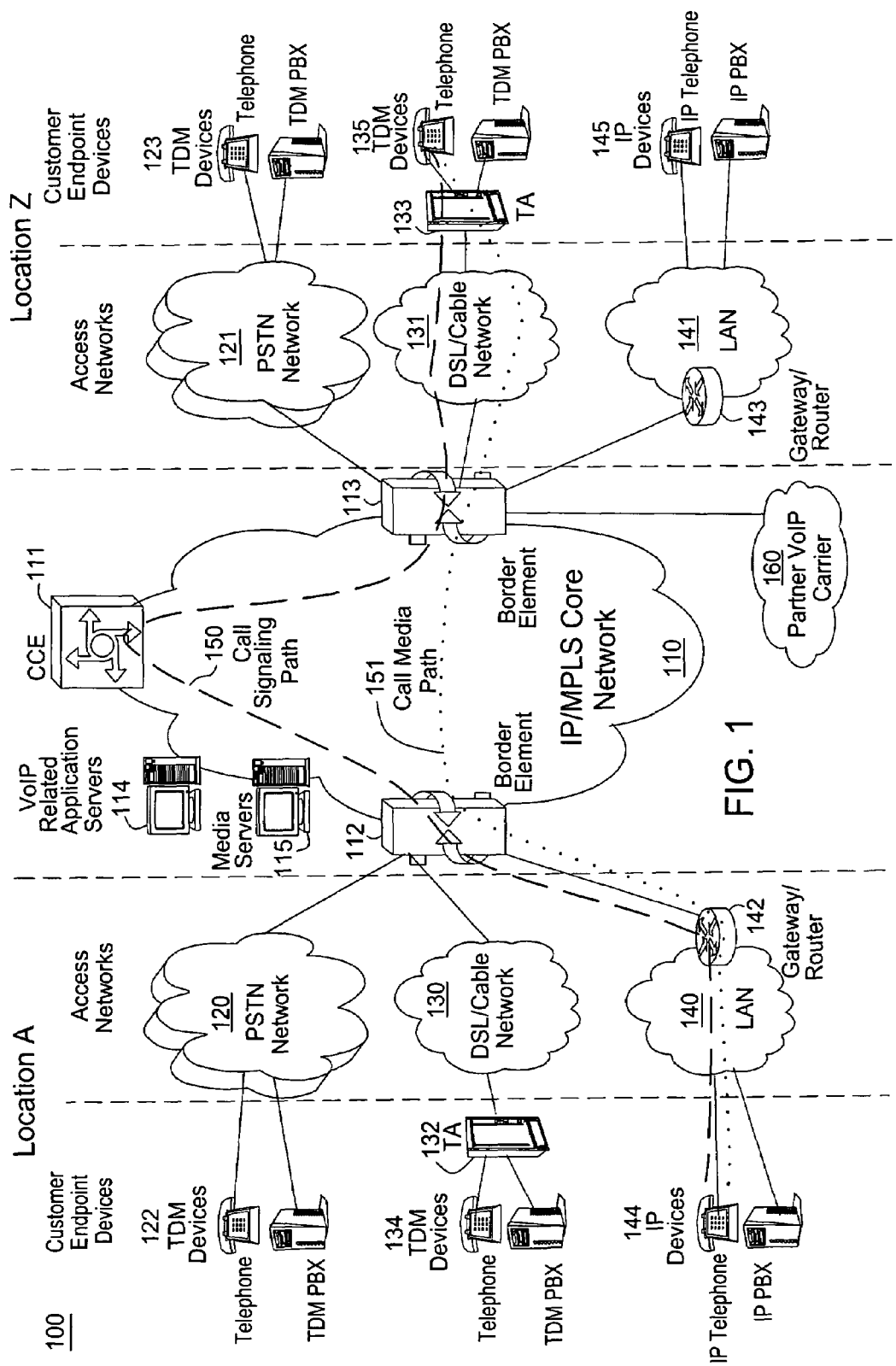
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Customer data is frequently mapped to a particular application server in a packet network infrastructure, e.g., a VoIP network infrastructure. This mapping changes frequently as the service requirements of the customer changes and/or as physical changes are made in the application server environment within the VoIP network. Call Control Elements (CCE) need to access these Application Servers (AS) in order to retrieve and process customer specific service logic to complete phone calls. Hence, CCEs need to know which application server contains the customer specific information needed to complete a call originated from or destined to a particular subscriber. In a large VoIP network, there may be many CCEs. As the IP addresses of particular ASs change, the CCEs need to determine the correct IP address of a particular AS to communicate with in order to obtain and process the correct customer specific routing and service logic information. If the CCEs do not have the correct information associated with the particular AS that the CCEs need to communicate with, a call can fail.

To address this need, the present invention enables Application Servers to automatically update the databases used by Call Control Elements as changes occur between customer data, such as customer specific service logic, and the Application Servers, such as the IP addresses of the Application Servers. Whenever a change in the location of customer specific data needed by the CCEs from one AS to a new AS, the customer identity, such as the customer phone number, and the IP address of the new AS in which the customer data resides, the new AS will automatically update the relevant database in the CCEs to indicate such an update has occurred. After the automatic update is performed, the CCEs will be able to communicate with the correct AS to retrieve and process the customer specific service logic.

Figure 2:
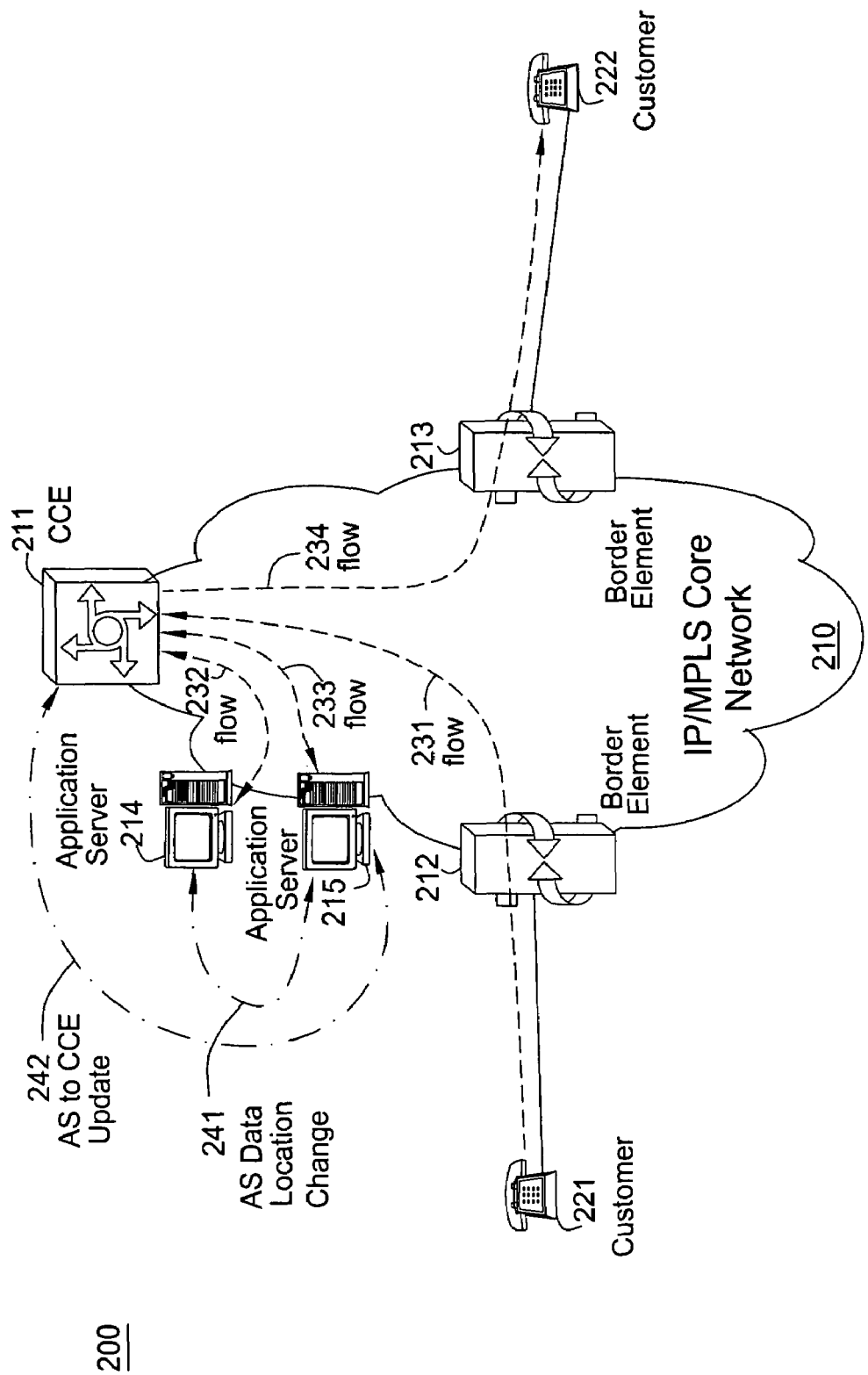
FIG. 2 illustrates an example of sending automatic updates to Call Control Element (CCE) from Application Server (AS) in a VoIP network related to the present invention.

FIG. 2 illustrates an exemplary communication architecture 200 for sending automatic updates to a Call Control Element (CCE) from an Application Server (AS) in a VoIP network 210 related to the present invention. In FIG. 2, a typical call flow for setting up a call between customer 221 and 222 involves sending a call setup signaling message by customer 221 to CCE 211 using flow 231 via BE 212. Then CCE 211 communicates with AS 214 using flow 232 to verify, obtain, and process the necessary information related to the subscription of customer 211 before forwarding the call setup message towards customer 222 using flow 234 via BE 213. CCE 211 stores the IP address of AS 214 that it needs to consult with in order to process the aforementioned call setup procedures. In the scenario where the subscription information pertaining to customer 221 is to be updated due to, for instance, a change in subscription features, the updated subscription information originally stored in AS 214 will be stored in AS 215 instead, as shown in flow 241, due to operations reasons. The new location of the updated subscription information associated with customer 221 needs to be advertised to CCE 211. In particular, the IP address of AS 215 needs to be advertised by AS 215 to CCE 211 using flow 242 for the aforementioned change. Once the update has been completed, the new call flow for setting up a call between customer 221 and 222 involves sending a call setup signaling message by customer 221 to CCE 211 using flow 231. Then CCE 211 consults with AS 215 using flow 233 to verify, obtain, and process the necessary information related to the subscription of customer 211 before forwarding the call setup message toward customer 222 using flow 234. CCE 211 stores the IP address of AS 215 that it needs to consult with in order to process the call setup procedures for customer 221 with the new call flow as described. It should be noted that although FIG. 2 only illustrates one CCE, the present invention is not so limited. A core network may employ a plurality of CCEs.

Figure 3:
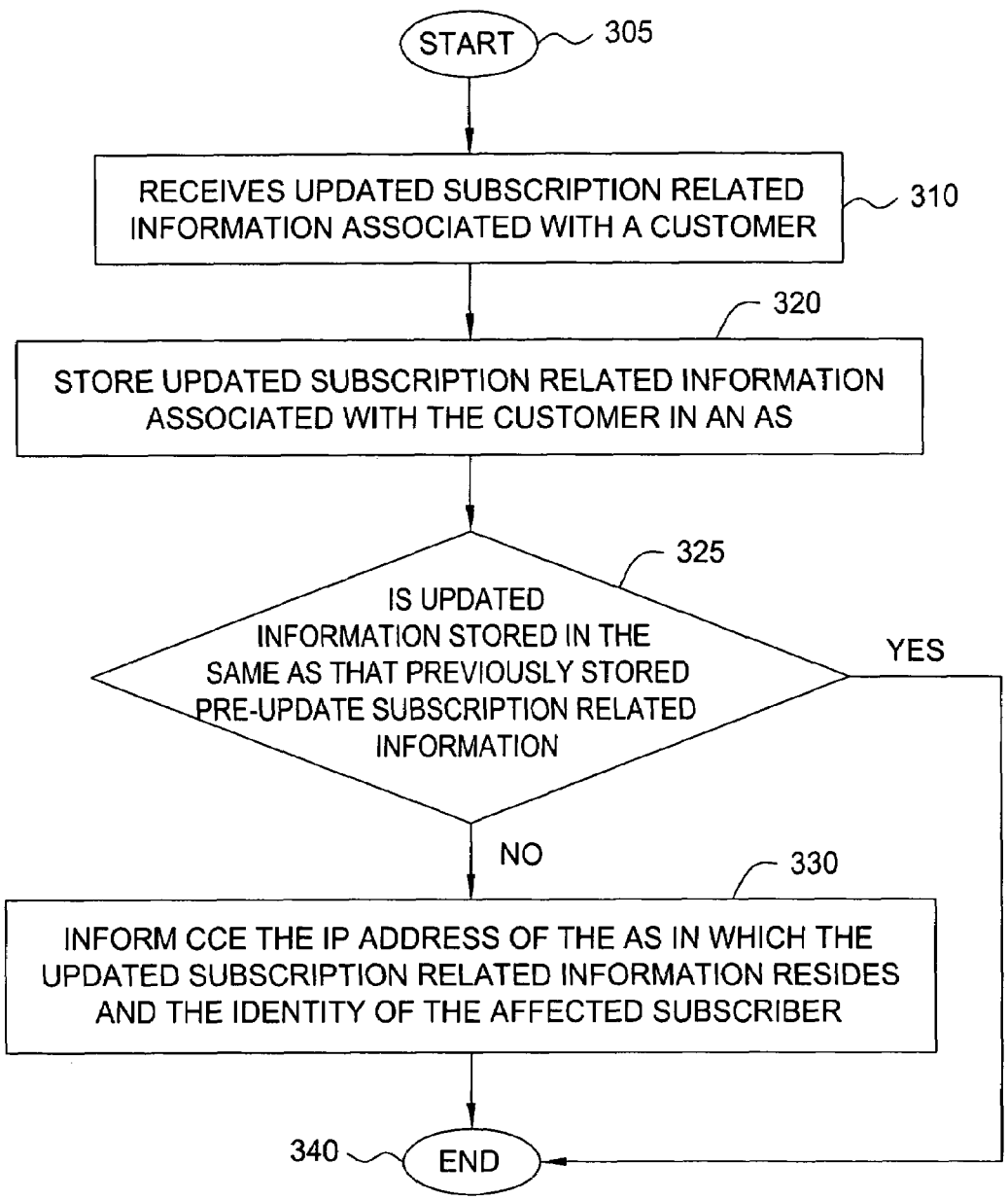
FIG. 3 illustrates a flowchart of a method for sending automatic updates to Call Control Element (CCE) from Application Server (AS) in a VoIP network of the present invention.

FIG. 3 illustrates a flowchart of a method 300 for sending automatic updates to a Call Control Element (CCE) from an Application Server (AS) in a packet network, e.g., a VoIP network of the present invention. Method 300 starts in step 305 and proceeds to step 310.

In step 310, the method receives an update related to subscription information associated with a customer or subscriber, where the update information may comprise a services feature subscribed by the subscriber, a routing logic associated with the subscriber or a service logic associated with the subscriber. For example, a new AS receives subscription information for a customer from another AS in the packet network.

In step 320, the method stores the updated subscription information associated with the customer in an AS.

In step 325, the method checks if the updated subscription information is stored in the same AS that previously stores pre-update subscription information of the same subscriber. For example, whether the AS that received the updates is the AS that is usually tasked with storing such information for the same subscriber or customer. If the AS is the same AS, the method proceeds to step 340; otherwise, the method proceeds to step 330.

In step 330, the method informs the CCE in the network of the new IP address of the AS which is currently storing the updated subscription information associated with the customer and the customer identity of the affected subscriber. Namely, the new AS will be tasked with communicating this information to all the relevant CCEs if there are more than one affected CCE. The method ends in step 340.

Figure 4:
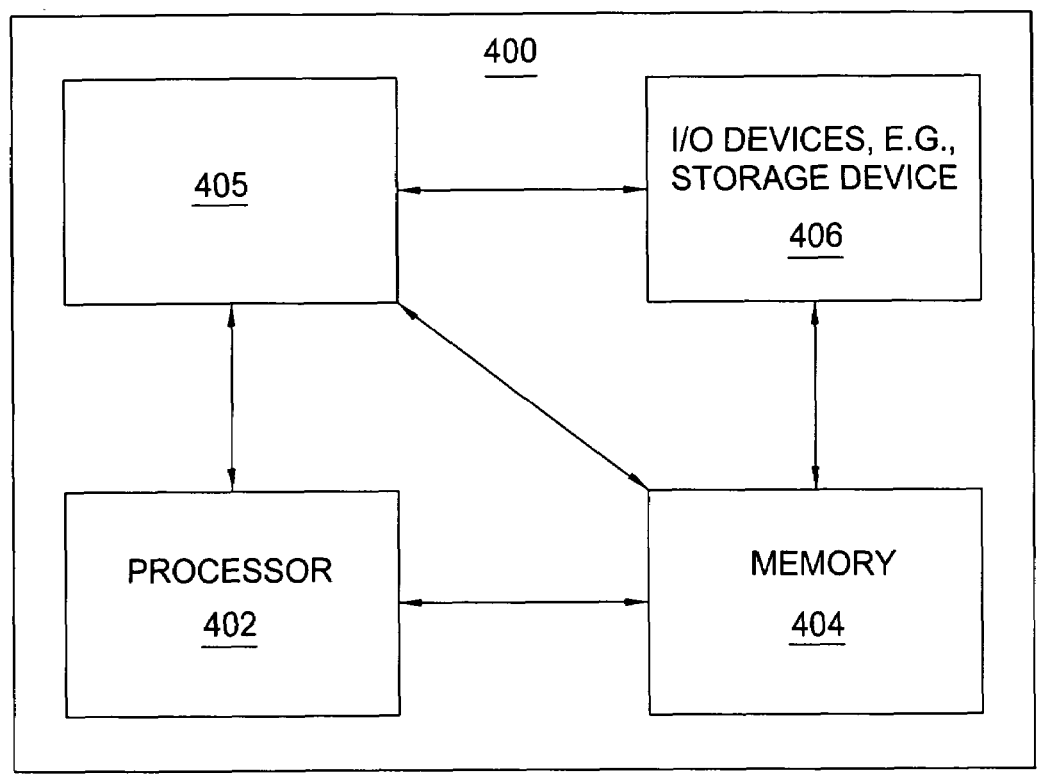
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for sending automatic updates to a CCE, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for sending automatic updates to a CCE can be loaded into memory 404 and executed by processor 402 to implement the functions as discussed above. As such, the present process 405 for sending automatic updates to a CCE (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for sending an update to a Call Control Element (CCE) in a communication network, comprising:
   receiving updated customer specific information associated with a subscriber at a second application server (AS) of the communication network, where said updated customer specific information is sent by a first application server (AS) directly to said second AS;
   storing said updated customer specific information in said second AS; and
   sending an Internet Protocol (IP) address of said second AS and a customer identity associated with said subscriber to at least one CCE.

2. The method of claim 1, wherein said communication network is a Voice over Internet Protocol (VoIP) network or a Service over Internet Protocol (SoIP) network.

3. The method of claim 1, wherein said customer identity comprises a phone number of said subscriber.

4. The method of claim 1, wherein said updated customer specific information comprises at least one of: a services feature subscribed by said subscriber, a routing logic associated with said subscriber or a service logic associated with said subscriber.

5. The method of claim 1, further comprising:
   using said IP address by said at least one CCE for processing a call setup message.

6. The method of claim 1, wherein said Internet Protocol (IP) address of said second AS and said customer identity are sent to said at least one CCE by said second AS.

7. The method of claim 1, wherein said first AS and said at least one CCE also reside in the communication network.

8. A computer-readable medium having stored thereon a plurality of instructions, the plurality of instructions including instructions which, when executed by a processor, cause the processor to perform the steps of a method for sending an update to a Call Control Element (CCE) in a communication network, comprising:
   receiving updated customer specific information associated with a subscriber at a second application server (AS) of the communication network, where said updated customer specific information is sent by a first application server (AS) directly to said second AS;
   storing said updated customer specific information in said second AS; and
   sending an Internet Protocol (IP) address of said second AS and a customer identity associated with said subscriber to at least one CCE.

9. The computer-readable medium of claim 8, wherein said communication network is a Voice over Internet Protocol (VoIP) network or a Service over Internet Protocol (SoIP) network.

10. The computer-readable medium of claim 8, wherein said customer identity comprises a phone number of said subscriber.

11. The computer-readable medium of claim 8, wherein said updated customer specific information comprises at least one of:
    a services feature subscribed by said subscriber, a routing logic associated with said subscriber or a service logic associated with said subscriber.

12. The computer-readable medium of claim 8, further comprising:
    using said IP address by said at least one CCE for processing a call setup message.

13. The computer-readable medium of claim 8, wherein said Internet Protocol (IP) address of said second AS and said customer identity are sent to said at least one CCE by said second AS.

14. The computer-readable medium of claim 8, wherein said first AS and said at least one CCE also reside in the communication network.

15. An apparatus for sending an update to a Call Control Element (CCE) in a communication network, comprising:
   means for receiving updated customer specific information associated with a subscriber at a second application server (AS) of the communication network, where said updated customer specific information is sent by a first application server (AS) directly to said second AS;
   means for storing said updated customer specific information in said second AS; and
   means for sending an Internet Protocol (IP) address of said second AS and a customer identity associated with said subscriber to at least one CCE.

16. The apparatus of claim 15, wherein said communication network is a Voice over Internet Protocol (VoIP) network or a Service over Internet Protocol (SoIP) network.

17. The apparatus of claim 15, wherein said customer identity comprises a phone number of said subscriber.

18. The apparatus of claim 15, wherein said updated customer specific information comprises at least one of: a services feature subscribed by said subscriber, a routing logic associated with said subscriber or a service logic associated with said subscriber.

19. The apparatus of claim 15, further comprising:
   means for using said IP address by said at least one CCE for processing a call setup message.

20. The apparatus of claim 15, wherein said Internet Protocol (IP) address of said second AS and said customer identity are sent to said at least one CCE by said second AS.

* * * * *